United States Patent [19]
Gerard et al.

[11] Patent Number: 6,092,079
[45] Date of Patent: Jul. 18, 2000

[54] APPARATUS AND METHOD FOR UPDATING AN OBJECT WITHOUT AFFECTING THE UNIQUE IDENTITY OF THE OBJECT

[75] Inventors: Scott Neal Gerard; Steven Lester Halter; Steven J. Munroe; Erik E. Voldal, all of Rochester, Minn.

[73] Assignee: International Business Machines Corporation, Armonk, N.Y.

[21] Appl. No.: 09/056,658

[22] Filed: Apr. 7, 1998

Related U.S. Application Data

[63] Continuation-in-part of application No. 09/015,473, Jan. 29, 1998, Pat. No. 6,023,704.

[51] Int. Cl.[7] .................................................. G06F 17/30
[52] U.S. Cl. ........................... 707/103; 707/101; 707/203
[58] Field of Search .................................... 707/3, 4, 103, 707/101, 200, 203

[56] References Cited

U.S. PATENT DOCUMENTS

| 5,189,733 | 2/1993 | Bennett et al. | 711/710 |
| 5,404,525 | 4/1995 | Endicott et al. | 395/700 |
| 5,784,620 | 7/1998 | Isham | 709/303 |
| 5,974,428 | 10/1999 | Gerard et al. | 707/203 |

*Primary Examiner*—Jean R. Homere
*Attorney, Agent, or Firm*—Martin & Associates, LLC; Derek P. Martin

[57] ABSTRACT

A second object is created which is an instance of a first class. The data from the first object is copied into the second object. The method table pointer of the first object is then changed to the method table of the second class. The data section of the first object is then reallocated according to the data requirements of the second class. The data in the second object is then converted to data in the first object. The resultant first object has both methods and data updated to the second class without passivating the object.

13 Claims, 9 Drawing Sheets

Prior Art

APPARATUS AND METHOD FOR UPDATING AN OBJECT WITHOUT AFFECTING THE UNIQUE IDENTITY OF THE OBJECT

RELATED APPLICATION

This patent application is a continuation-in-part of Ser. No. 09/015,473 filed Jan. 29, 1998, entitled "APPARATUS AND METHOD FOR SWAPPING OBJECT IDENTITIES" now U.S. Pat. No. 6,023,704, which is incorporated herein by reference.

BACKGROUND OF THE INVENTION

1. Technical Field

This invention generally relates to object oriented programming and more specifically relates to an apparatus and method for updating objects in an object oriented system.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors, and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago. Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object oriented programming promotes the reusability of existing object definitions and promotes more efficient use of program code.

An object in an object oriented computer program typically has attributes defined by state data that determine how the object will behave. State data as used herein defines both methods and data within an object, and is a concept that is well-known to one skilled in the art. If an object is transient, it is created within a process, and terminates when the process ends. If an object is persistent, however, mechanisms are put in place to allow the object to survive the process that creates it so it can be accessed by other processes.

Objects are typically made persistent by storing their state data in a local data store. In many known computer system, the process of making an object persistent is known as "externalization". Externalization is the means or protocol used in object oriented programming for transferring data out of an object. In essence the state data that defines the attributes of an object are "externalized", or written out of the object, into a different format that is easily stored in the local data store. When the object is needed again, the externalized state data is internalized into an object, creating an exact copy of the object as it previously existed.

Computer programs naturally evolve over time. Changing an object oriented program requires changes to objects. When changes to persistent objects are required, there is no uniform mechanism for updating the persistent objects. For example, assume a company has an Employee class that contains the employee's name; address, including 5-digit ZIP code; and home telephone number. Let's further assume that the employee class needs to be changed to incorporate a nine digit ZIP code and to include a department code for the employee. A new class is defined with the additional data fields for the ZIP code and the department. But how is the existing, persistent object updated so that it contains the additional data fields?

Figure 2:
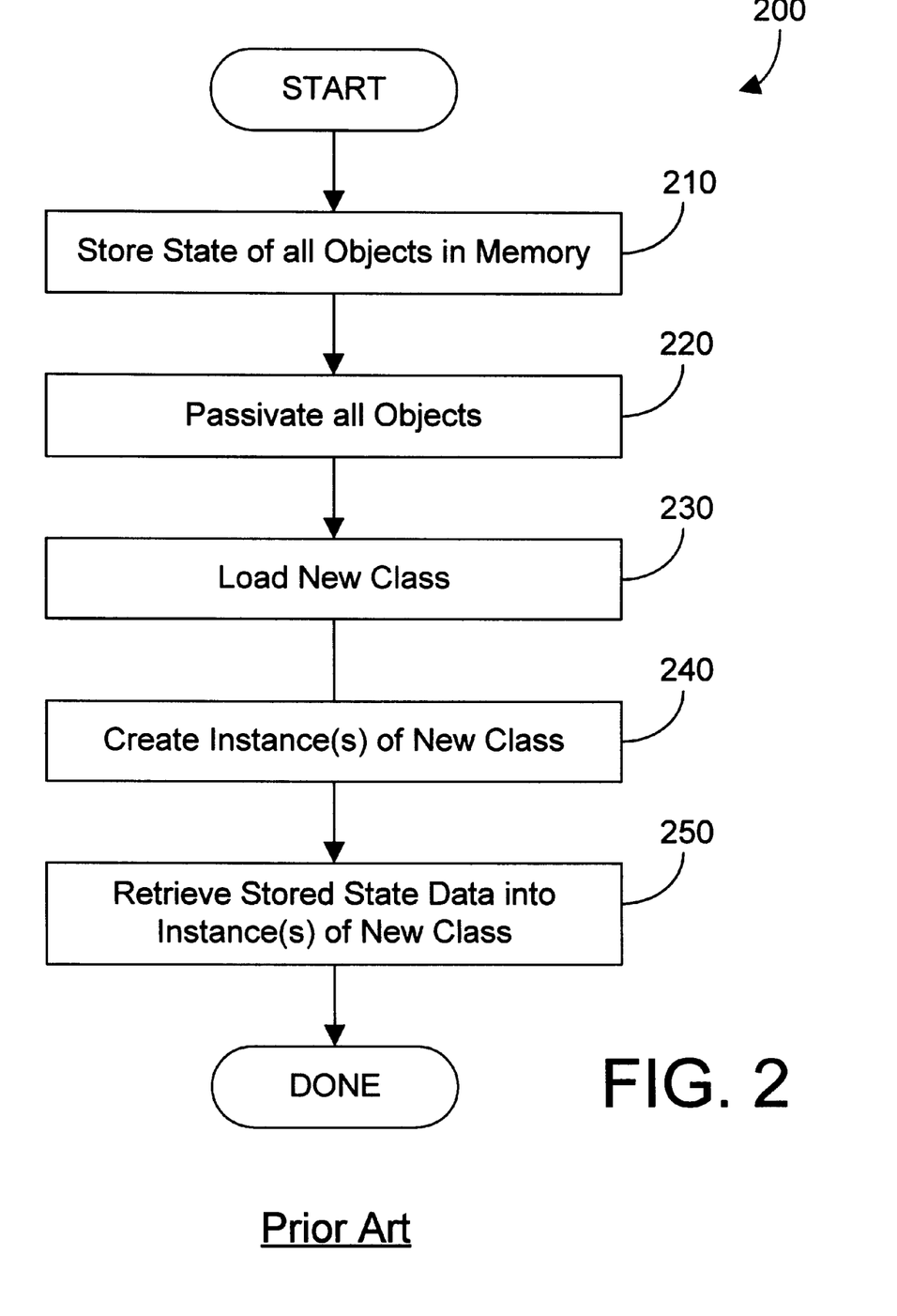
FIG. 2 is flow diagram of a prior art method of updating persistent objects.

Referring to FIG. 2, one known method 200 for updating persistent objects first stores the state of all objects in the system in memory (step 210), generally by externalizing the object data to a data store. Next, all the objects in the system are passivated (step 220). The new class is loaded (step 230), an instance of the new class is created (step 240), and one or more methods on the new class are invoked to retrieve the stored state data (step 250), generally by internalizing the state data into the new instance(s) of the new class. While this method succeeds at updating the persistent objects, it requires that all processes that access the objects be shut down in order to passivate the objects. With large systems that have thousands or millions of objects, this process can be very time-consuming, and can take a computer system off-line for many hours. Shutting down a large computer system for many hours is an unacceptable solution for many computer systems. Without a mechanism for easily updating persistent objects without shutting down, the computer industry will continue to suffer from inefficient and costly methods of updating persistent objects in an object oriented computer system.

DISCLOSURE OF INVENTION

According to preferred embodiments of the present invention, an object update mechanism dynamically updates the configuration of a first object from a first class to a second class. According to a first embodiment, a second object is created which is an instance of the first class. The data from the first object is copied into the second object.

The method table pointer of the first object is then changed to the method table of the second class. The data section of the first object is then reallocated according to the data requirements of the second class. The data in the second object is then converted to data in the first object. The resultant first object has both methods and data updated to the second class without passivating the object. According to a second embodiment, the method table pointer of the first object is changed to point to the second class. The data section of the first object is then disconnected from the first object, and a new data section is allocated to the first object according to the data requirements of the second class. The data from the disconnected data section is then converted to data in the newly allocated data section, and the disconnected data section is then deleted. The apparatus and methods disclosed herein permit dynamic updating of persistent objects without passivating the objects and without changing the identity of the objects.

BRIEF DESCRIPTION OF THE DRAWINGS

The preferred embodiments of the present invention will hereinafter be described in conjunction with the appended drawings, where like designations denote like elements, and.

BEST MODE FOR CARRYING OUT THE INVENTION

The present invention relates to object oriented programming techniques. For those individuals who are not generally familiar with object oriented programming, the Overview section below presents many of the basic concepts and terminology that will help to understand the invention. Individuals skilled in the art of object oriented programming may wish to skip this section and proceed directly to the Detailed Description section of this specification.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Object Identities in an Object Oriented System

The identity of an object is typically defined by its address in memory where it resides. In a large system with many objects, a single object may be referenced by hundreds or thousands of other objects. Each object that references another object identifies the referenced object with a pointer containing its address. Now, let's assume that a referenced object needs to be changed to incorporate an additional data field. The prior art method 200 described in the Background of the Invention requires that all objects be passivated, that the new class defining the new object configuration be loaded, and that new instances are created. During this process, each object that references another object will dynamically determine the address of the referenced object. However, shutting down a computer system to make a minor change to one class that changes the configuration of a class' data is not a workable solution.

A different method might create a new instance of the new class, which would have a new identity. This method would require that each object that references the old object update their pointers to point to the new object. There is no architected mechanism in place in object oriented systems to allow objects to automatically update their references to other objects. One solution might be to force each object that references another object to register with the other object so that the pointers in all objects in the registry can be changed if the identity of the referenced object changes. However, this solution would create massive overhead, both in data storage requirements and in performance when updating objects.

The identity of each object must be unique from all other objects. If an object is large, destroying the object would effectively make unusable a large chunk of memory that corresponds to the object. To address this concern, an object oriented system can allocate an object header separate from the methods and data for the object. This separation allows the object header to be very small, which minimizes wasted memory when an object is destroyed. For example, referring to FIG. 4, a first object 126 has a header called Header 1 at a fixed address in memory, which includes a method table pointer 410 and a data pointer 420. Method table pointer 410 points to a method table 430, while data pointer 420 points to the object data 440. If object 126 is destroyed, the memory that defines the method table 430 and data 440 can be reused. Only the header that contains the method table pointer 410 and data pointer 420 will be unusable for other objects, minimizing the wasted memory when an object is destroyed.

2. Detailed Description

According to preferred embodiments of the present invention, an apparatus and method provide for updating the configuration of an existing object to a new configuration. The preferred embodiments are particularly useful in updating the configuration of persistent objects in an object oriented computer system.

Figure 1:
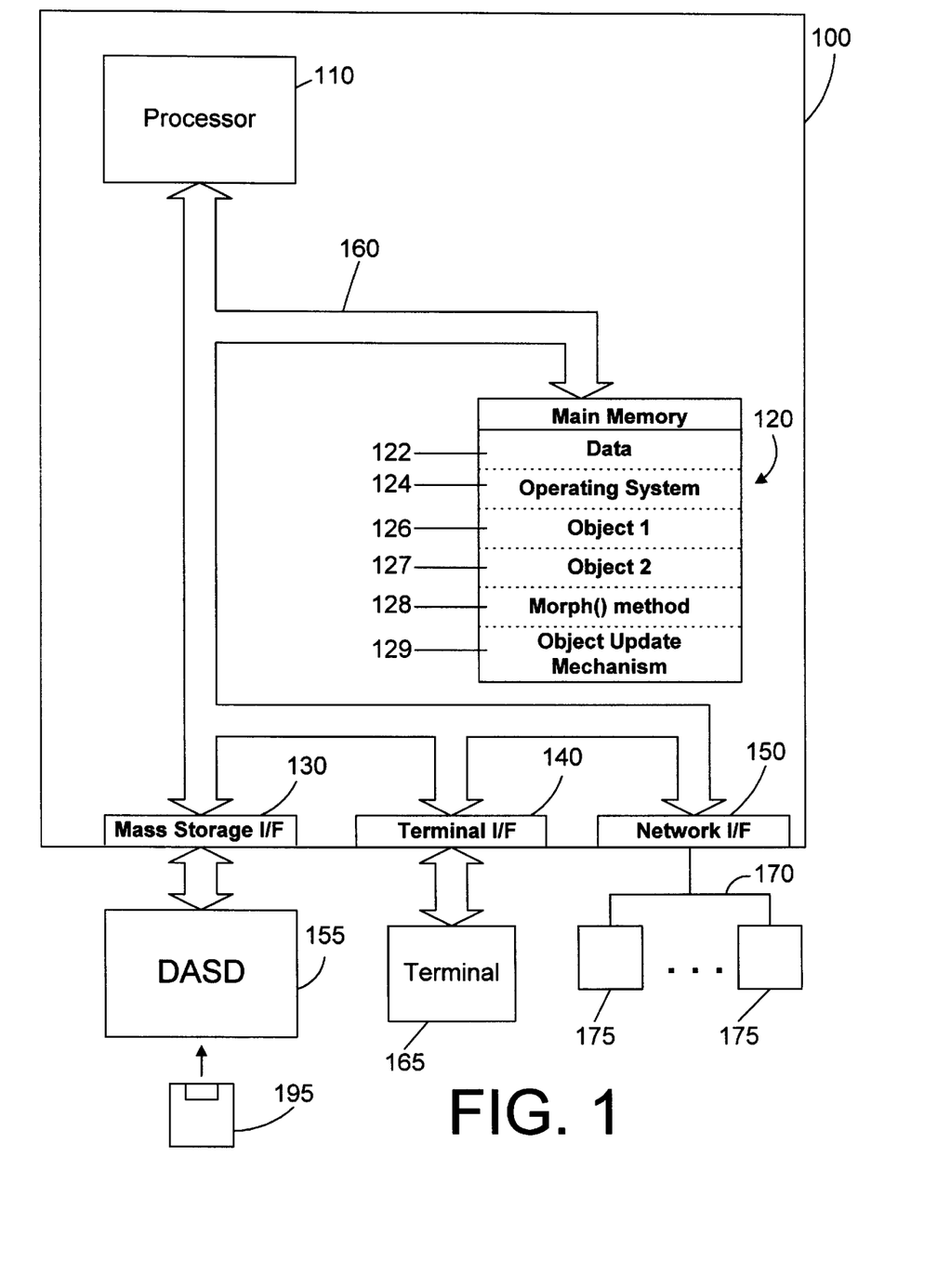
FIG. 1 is a block diagram of an apparatus according to a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 includes data 122, operating system 124, a first object 126, a second object 127, a morph( ) method 128, and an object update mechanism 129. Objects 126 and 127 are common objects in an object oriented programming environment. For the preferred embodiments, objects 126 and 127 are persistent objects, but the present invention expressly encompasses the updating of both transient and persistent objects. Morph( ) method 128 is a method that changes an object when called. Object update mechanism 129 uses the morph( ) method 128 to update the configuration of object 126 in accordance with the preferred embodiment.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, first and second objects 126 and 127, morph( ) method 128, and object update mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of object update mechanism 129 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 3:
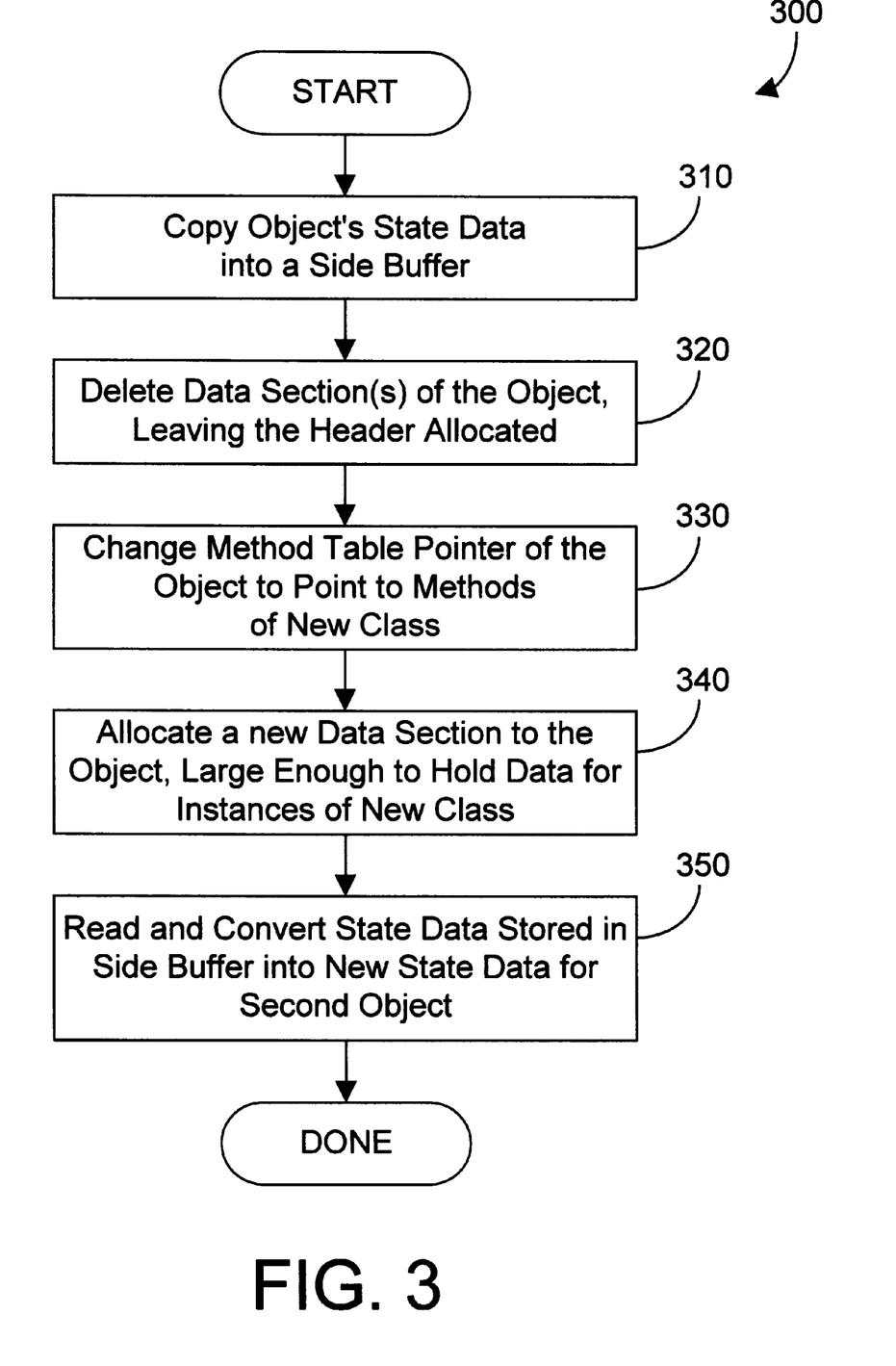
FIG. 3 is a flow diagram showing one possible method for updating persistent objects.
Figure 4:
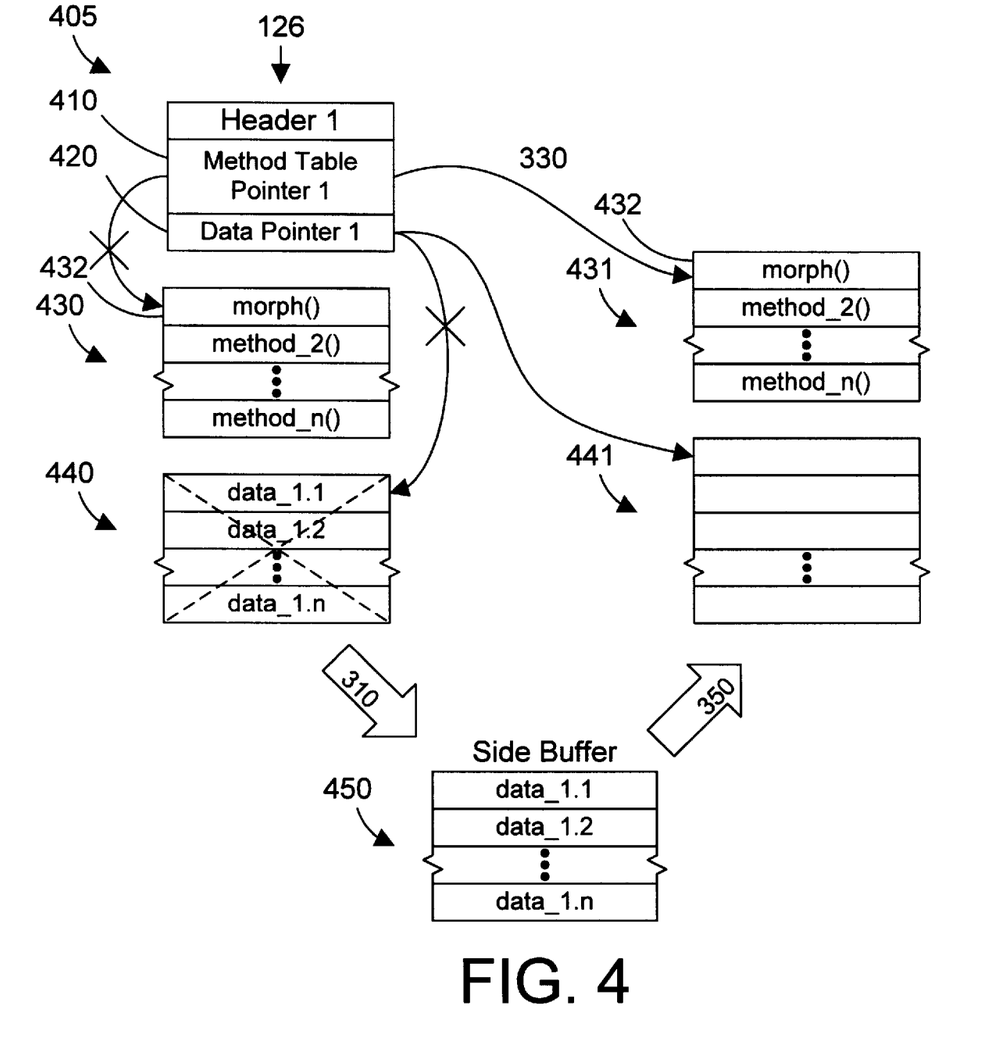
FIG. 4 is a block diagram showing the state of object 126 during some of the steps of method 300 of FIG. 3.

As described in the Background of the Invention, the prior art method 200 of FIG. 2 for updating objects is not an acceptable solution for many computer systems because shutting down the computer to passivate all objects would create unacceptable down-time. Referring to FIGS. 3 and 4, one possible method 300 for updating objects without passivating all objects would use a side buffer 450 to store the state data for an object 126, and then change object 126 to match the configuration of a new class. The result is an object 126 that has been transformed from one class to a different class. Method 300 starts by copying the state data for object 126 into the side buffer 450 (step 310). Next, the data sections 440 of the object are deleted (step 320). The method table pointer 410 is then changed to point to the methods of the new class (step 330). Next, a new data section 441 that is large enough to hold data for instances of the new class is allocated to object 126. The state data stored in side buffer 450 is then read and converted to the appropriate state data of the object 126. This is suitably performed by invoking a morph( ) method 432 on object 126. The first object 126 is thus converted from a first class to a second class without changing the address of the object. Note that the copy to the side buffer 450 in step 310 may be suitably accomplished by externalizing the object, and reading the data from side buffer 450 into the object may be accomplished by internalizing the data into the object. However, one skilled in the art will appreciate that there are numerous different ways for moving data between object 126 and side buffer 450.

Figure 5:
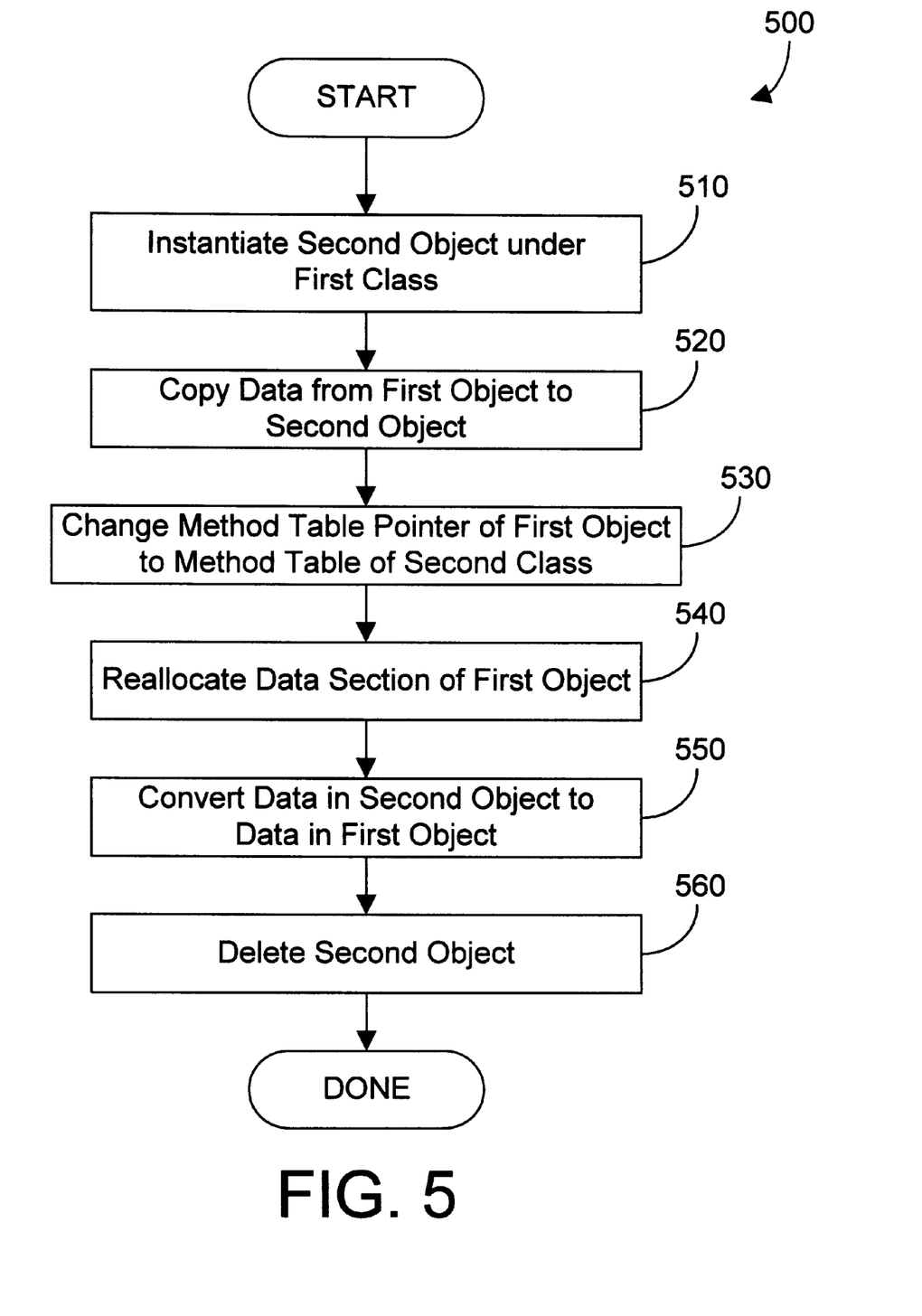
FIG. 5 is a flow diagram of a method for updating a persistent object in accordance with a first embodiment of the present invention.

Referring to FIG. 5, a method 500 in accordance with a first embodiment of the present invention overcomes the many drawbacks of method 200 of FIG. 2, and in a manner that is different than method 300 of FIG. 3. Method 500 is suitably performed by object update mechanism 129 of FIG. 1. Method 500 starts by instantiating a second object under the same class as the first object (step 510). Next, the data from the first object is copied to the second object (step 520). Then the method table pointer of the first object is changed to point to the method table of the desired new class configuration, denoted herein as the "second class" (step 530). A new data section is then allocated to the first object (step 540), which is large enough to hold data for instances of the new, second class. Next, the data in the second object is converted to data in the first object (step 550), preferably by invoking a morph( ) method on the second class, passing instance 127 as a parameter. Finally, the second object is deleted (step 560). The result is an updated object defined by the new second class that has the relevant state data from the first object and that retains the unique identifier for the first object.

Figure 6:
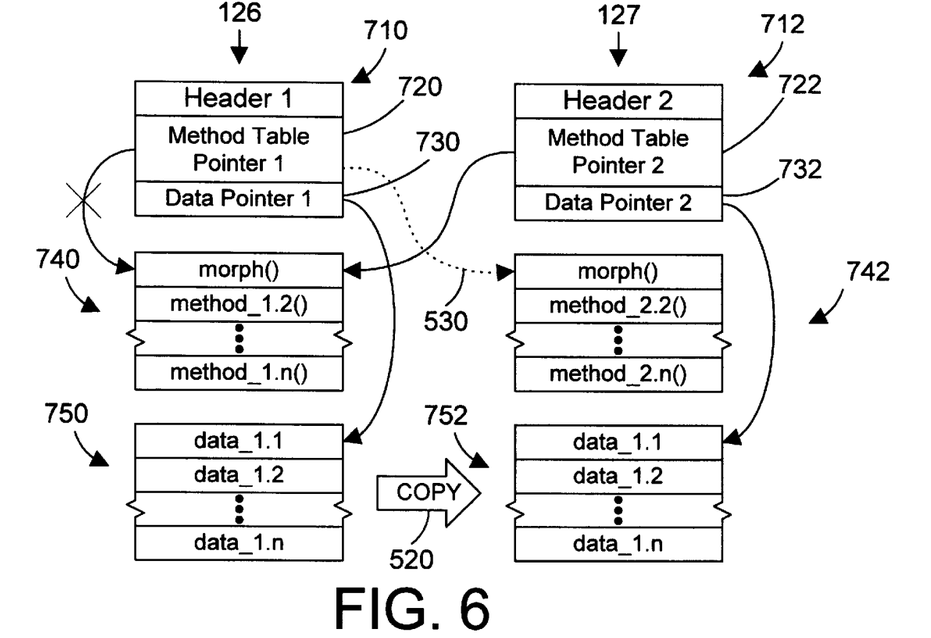
FIGS. 6–8 are block diagrams showing the state of two objects during the various steps of method 500 of FIG. 5.
Figure 7:
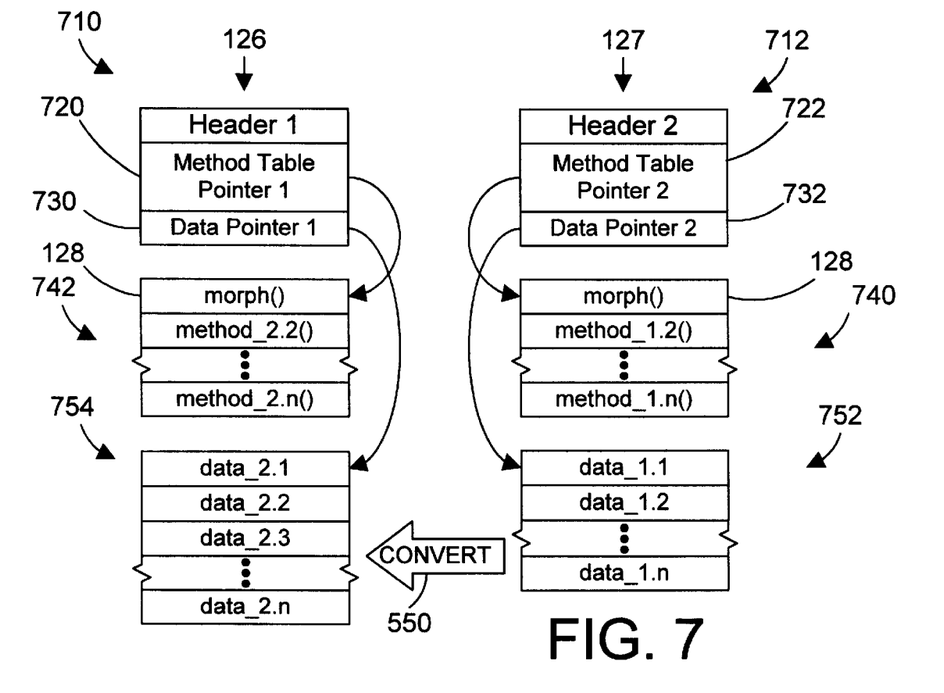
Figure 8:
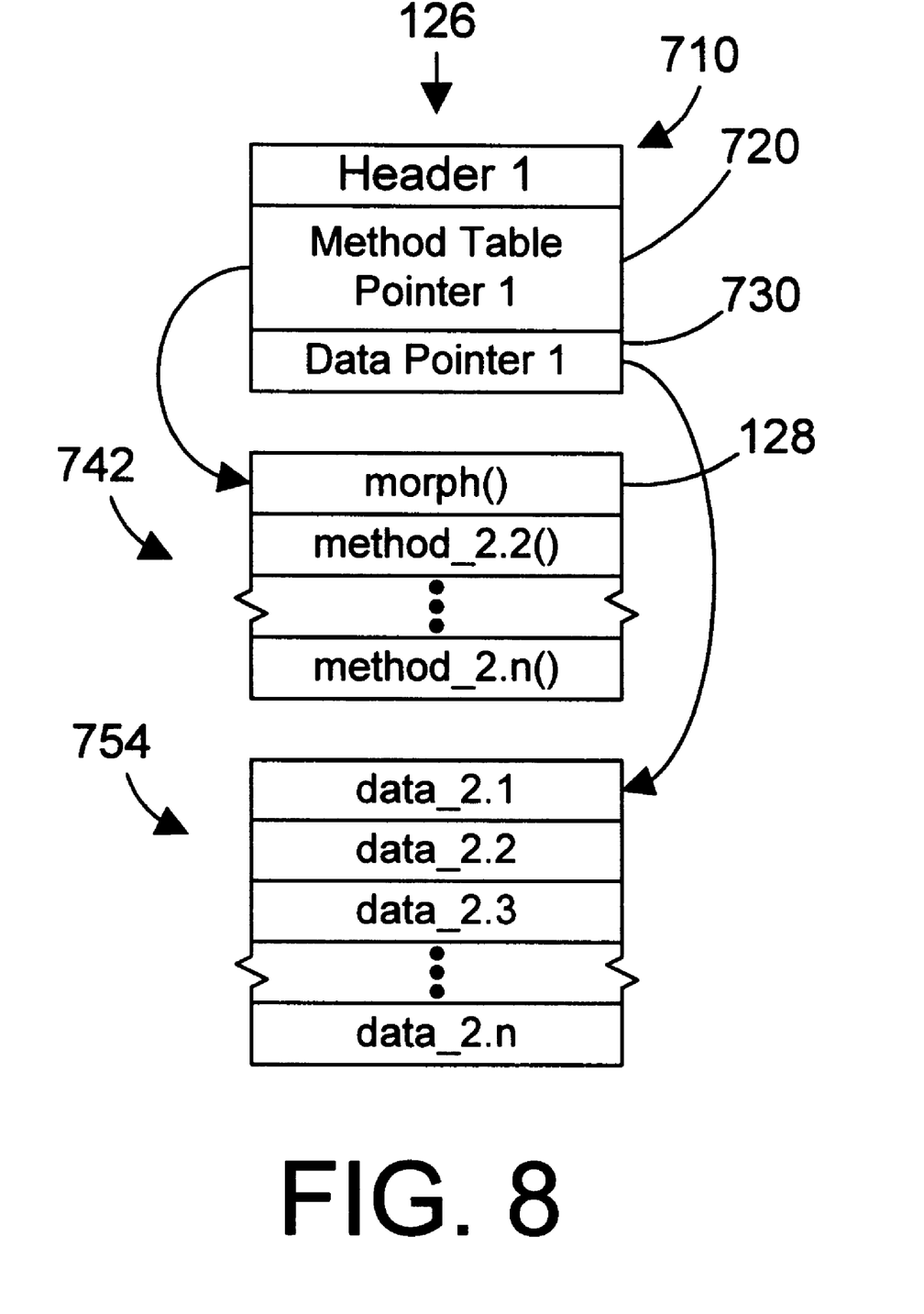

One example in accordance with method 500 of FIG. 5 is illustrated in FIGS. 6–8. A first object 126 includes a header 710 that has a method table pointer 720 and a data pointer 730. Method table pointer 720 points to a method table 740, while data pointer 730 points to the data structure 750 that contains the object data. This is the configuration of first object 126 when method 500 begins. Step 510 of method 500 instantiates a second object 127 as an instance of the first class. Second object 127 has a header 712 that includes a method table pointer 722 and a data pointer 732. Method table pointer 722 points to method table 740 of the first class, while data pointer 732 points to a new data section 752.

Step 520 of FIG. 5 copies the data from the first object to the second object, shown in FIG. 6 as a copy operation between data sections 750 and 752. Step 530 changes the method table pointer 720 from the methods on the first class to the methods on the second class, shown by the dotted line in FIG. 6. Step 540 allocates a new data section 754 to the first object, as shown in FIG. 7. Data section 754 supports all the data for the second class. Step 550 then converts the state data in the second object into the data of the first object, as shown by the convert arrow in FIG. 7. Note that method table 742 contains a morph( ) method 128. Morph( ) method 128 contains intelligence regarding the configuration of the first object and the second object, and how to make the data conversion from the first to the second. The implementer of the second class must also implement the morph( ) method that can make the metamorphosis between data in the first class and data in the second class. Finally, step 560 deletes the second object 127. At this point, first object 126 has been updated to a new configuration defined by the second class as shown in FIG. 8 without disturbing the identity of the object defined by the object header.

One skilled in the art will appreciate that various changes could be made to achieve the end result of updating objects withing the scope of the present invention. For example, instead of allocating a new data section 752 and pointing data pointer 732 at the new data section 752, data pointer 732 could be set to point to the old data section 750. Effectively, the new instance "takes over" the data of the old instance. This and other variations are expressly within the scope of the present invention.

Object update mechanism 129 therefore updates a first object from an instance of a first class to an instance of a second class, using a morph( ) method 128 in accordance with the preferred embodiments of the present invention. Object update mechanism 129 updates an object to change the size and/or configuration of its state data while maintaining its identity.

Figure 9:
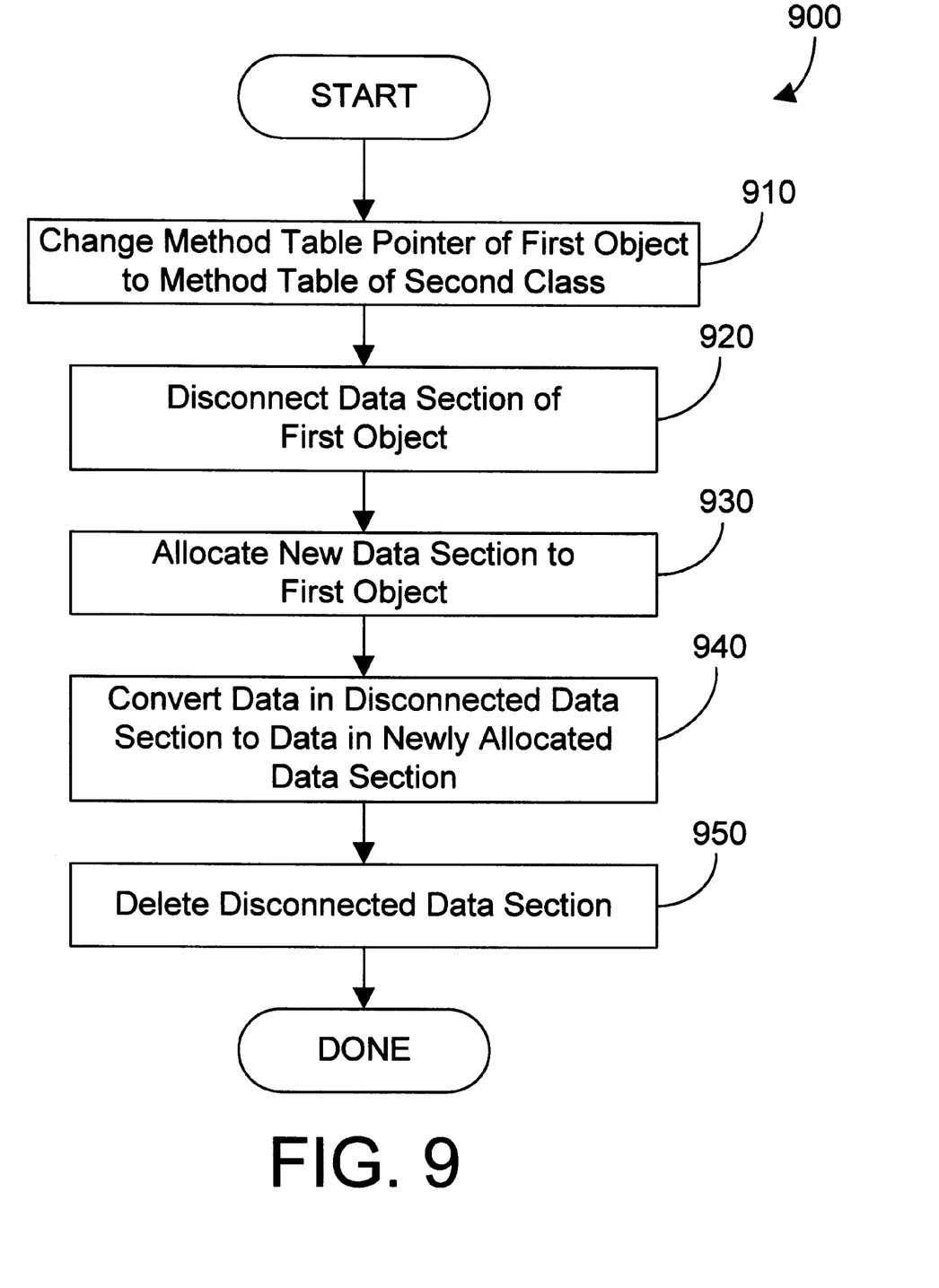
FIG. 9 is a flow diagram of a method for updating a persistent object in accordance with a second embodiment of the present invention.

Referring to FIG. 9, a method 900 in accordance with a second embodiment of the invention updates a first object from a first class to a second class. Method 900 begins by changing the method table pointer of the first object to the method table of the second class (step 910). Next, the data section of the first object is disconnected from the first object (step 920). A new data section is then allocated to the first object (step 930), and the data in the disconnected data section is converted to the data in the newly allocated data section of the first object (step 940). Finally, the disconnected data section is deleted (step 950).

Figure 10:
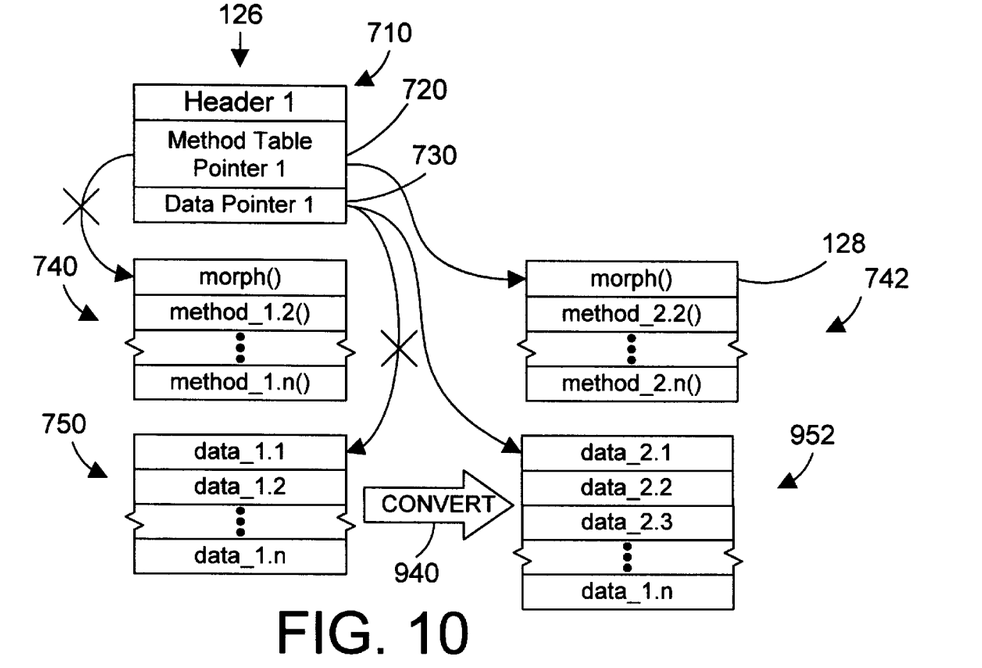
FIGS. 10–11 are block diagrams showing the state of an object during the various steps of method 900 of FIG. 9.
Figure 11:
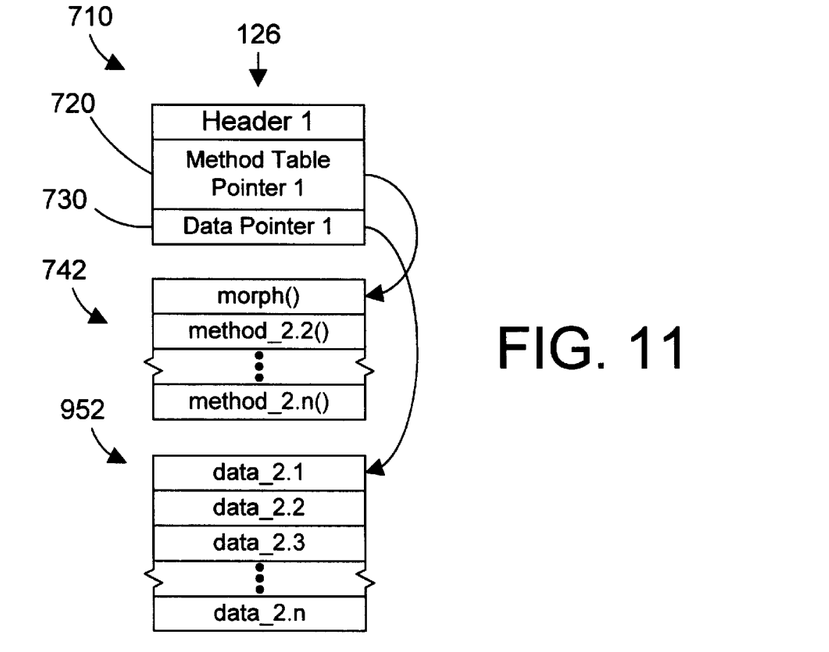

The operation of method 900 to update an object 127 is shown in FIGS. 10 and 11. The first step 910 is to change the method table pointer 720 from pointing to the method table 740 of the first class to the method table 742 of the second class. Next, step 920 disconnects the data section 750 of the first object 127. Step 930 then allocates a new data section to the first object by allocating the data section 952, and by pointing the data pointer 730 to data section 952, as shown in FIG. 10. Data section 952 supports the data for the second class. Step 940 then converts the data in the disconnected data section 750 to the newly allocated data section 952 of the first object. This conversion takes place by invoking the morph method 128 on the new class, passing the address of data section 750 as a parameter. Note that, unlike method 500, the morph method 128 of method 900 must have detailed knowledge regarding disconnected data section 750 in order to directly access and convert the data to the new data section 952, rather than just invoking methods on an object. Method 500, in contrast, converts the data from the second object to the first object by invoking methods on the second object. The final step 950 deletes the disconnected data structure 750, resulting in the updated object 710 shown in FIG. 11.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. A computer apparatus for updating objects in an object oriented system, the apparatus comprising:

at least one processor;

a memory coupled to the at least one processor;

a first object residing in the memory, the first object having a first unique identity and being an instance of a first class; and an object update mechanism residing in the memory and executed by the at least processor, the object update mechanism updating the first object from an instance of the first class to an instance of the second class without affecting the first unique identity of the first object.

2. A computer apparatus for updating objects in an object oriented system, the apparatus comprising:

at least one processor;

a memory coupled to the at least one processor;

a first object residing in the memory, the first object being an instance of a first class;

an object update mechanism residing in the memory and executed by the at least one processor, the object update mechanism updating the first object from an instance of the first class to an instance of a second class by creating a second object in the memory that is an instance of the first class, copying the state data from the first object to the second object, changing a method table pointer of the first object to point to a method table of the second class, allocating a new data section for the first object that conforms to the data requirements of the second class, and converting the state data in the second object into the first object.

3. The apparatus of claim 2 further comprising a morph method residing in the memory, executed by the at least one processor, and called by the object update mechanism to convert the state data in the second object into the first object.

4. The apparatus of claim 2 wherein the first object includes a unique identity, and wherein the object update mechanism updates the first object from an instance of the first class to the instance of the second class without affecting the unique identity of the first object.

5. A computer apparatus for updating objects in an object oriented system, the apparatus comprising:

a memory;

a first object residing in the memory, the first object being an instance of a first class;

means residing in the memory for creating a second object in the memory that is an instance of the first class;

means residing in the memory for copying state data from the first object to the second object;

means residing in the memory for changing a method table pointer of the first object to point to a method table of a second class;

means residing in the memory for allocating a new data section for the first object that conforms to data requirements of the second class; and means residing in the memory for converting the state data in the second object into the first object.

6. A computer-implemented method for updating a first object from an instance of a first class to an instance of a second class in an object oriented system, the method comprising the steps of:

creating a second object that is an instance of the first class;

copying state data from the first object to the second object;

changing a method table pointer of the first object to point to a method table of the second class;

allocating a new data section for the first object that conforms to data requirements of the second class; and converting the state data in the second object into the first object.

7. The method of claim 6 wherein the step of converting the state data comprises the step of invoking a morph( ) method on the second class.

8. The method of claim 6 wherein the first object includes a unique identity, and wherein the method updates the first object from an instance of the first class to the instance of the second class without affecting the unique identity of the first object.

9. A computer-readable program product for updating objects in an object oriented system, the program product comprising:

an object update mechanism that updates a first object from an instance of a first class to an instance of a second class by creating a second object that is an instance of the first class, copying state data from the first object to the second object, changing a method table pointer of the first object to point to a method table of the second class, allocating a new data section for the first object that conforms to the data requirements of the second class, and converting the state data in the second object into the first object; and signal bearing media bearing the object update mechanism.

10. The program product of claim 9 wherein the signal bearing media comprises recordable media.

11. The program product of claim 9 wherein the signal bearing media comprises transmission media.

12. The program product of claim 9 further comprising a morph method residing on the signal bearing media, the morph method being called by the object update mechanism to convert state data from the second object to the first object.

13. The program product of claim 9 wherein the first object includes a unique identity, and wherein the object update mechanism updates the first object from an instance of the first class to the instance of the second class without affecting the unique identity of the first object.

* * * * *